(12) United States Patent
Villers et al.

(10) Patent No.: US 8,595,396 B2
(45) Date of Patent: Nov. 26, 2013

(54) SYSTEM AND PROCESS FOR ACQUIRING A SOFTWARE CODE, CORRESPONDING HOST COMPUTER AND SOFTWARE TRANSMISSION PROCESS AND ASSOCIATED PRODUCTS

(75) Inventors: Denis Villers, Woluwe-St-Pierre (BE); Jan Rosseel, Scherpenheuvel-Zichem (BE)

(73) Assignee: Thomson Licensing, Boulogne-Billancourt (FR)

(*) Notice: Subject to any disclaimer, the term of this patent is extended or adjusted under 35 U.S.C. 154(b) by 1416 days.

(21) Appl. No.: 11/334,070

(22) Filed: Jan. 18, 2006

(65) Prior Publication Data
US 2006/0230193 A1 Oct. 12, 2006

(30) Foreign Application Priority Data
Jan. 19, 2005 (EP) .................... 05447005

(51) Int. Cl.
*G06F 3/00* (2006.01)
*G06F 5/00* (2006.01)

(52) U.S. Cl.
USPC ........................................................ 710/59

(58) Field of Classification Search
USPC ........................................................ 710/59
See application file for complete search history.

(56) References Cited

U.S. PATENT DOCUMENTS

| | | | |
|---|---|---|---|
| 6,069,879 A | 5/2000 | Chatter | |
| 6,658,489 B1 | 12/2003 | Asselin | |
| 6,760,333 B1 * | 7/2004 | Moody et al. ............. | 370/395.1 |
| 2004/0015935 A1 | 1/2004 | Sokolov et al. | |

FOREIGN PATENT DOCUMENTS

| | | |
|---|---|---|
| JP | 10004422 | 6/1998 |
| JP | 11074981 | 3/1999 |
| JP | 2000305771 | 11/2000 |
| JP | 2001318874 | 11/2001 |

OTHER PUBLICATIONS

Int'l Search Report, Jul. 13, 2005.
The USB 2.0 Promotor Group: "Universal Serial Bus Specification, pp. 33-35, 206-209, 217" Universal Serial Bus Specification Revision 2.0 'Online! Apr. 27, 2000 XP002335837 Retrieved from the Internet.
Tao Zhang: "leakage Proot program partitioning" Proceedings of The International Conference on Compilors, Architecture and Synthesis for Embedded Systems, Sep. 8, 2002 pp. 136-145 XP0022975616.

* cited by examiner

*Primary Examiner* — Chun-Kuan Lee
(74) *Attorney, Agent, or Firm* — Tutunjian & Bitetto, P.C.

(57) ABSTRACT

The present invention concerns a system and a process for acquiring a software code (SW) in a device from a host computer, a host computer and a software transmission process.

The system comprises receiving means of at least one code portion of the software code, at least two competing available code portions (Sik) being proposed simultaneously to the device for being downloaded, delaying means sending to the computer for each competing portion, successive negative acknowledgements (NAK), and selecting means of the code portion to be received among the competing available ones, the delaying means stopping sending the negative acknowledgements for the selected portion, so that the receiving means receive only the selected portion.

17 Claims, 4 Drawing Sheets

SYSTEM AND PROCESS FOR ACQUIRING A SOFTWARE CODE, CORRESPONDING HOST COMPUTER AND SOFTWARE TRANSMISSION PROCESS AND ASSOCIATED PRODUCTS

FIELD OF THE INVENTION

The present invention relates to a system and a process for acquiring a software code in a device, a host computer and software transmission process, and associated device and computer programs.

DESCRIPTION OF THE PRIOR ART

USB (for "Universal Serial Bus") bus-powered ADSL (for "Asymmetric Digital Subscriber Line") modem products, which are connected to host PCs (for "Personal Computers") through a USB bus, undergo high cost pressure. This pushes functionalities towards the hosts.

In previous generations, the software required for such a USB ADSL product has been stored in the PC and downloaded to the DSL modem when plugged in, thereby removing the need for a flash memory. The downloaded software is then stored in an SDRAM (for "Synchronous Dynamic Random Access Memory") of the modem. A big part of this software is devoted to modem synchronization and interoperability and needs flexibility for further enhancements.

It is now attractive to remove SDRAMs from the USB bus-powered modems for still decreasing the modem costs, by exploiting merely an on-chip SRAM (for "Static RAM")—indeed, an SDRAM uses extra technology layers with respect to SRAM and standard logic, to have better density, and can thus not be put on the same chip. However, storing the full build on-chip would require a large integrated SRAM, which would not be cost effective.

A solution for providing the modem having reduced storing space with the PC software would consist in downloading the software by small pieces, as and when required by a processor program evolution in the modem. A small SRAM in a digital IC (for "Integrated Circuit") of the modem may then be enough. This mechanism would be allowed by "swapping", namely by copying to a main memory area (modem processor memory limited in size) the content of an auxiliary memory area in the host computer (containing the full build). Thus, successive code "pages" or "swaps" would be downloaded from the PC to the modem, upon respective requests submitted by the modem to the PC.

Now, it is important to ensure the synchronization of the transfers of those pieces. However, this code swap mechanism would bring a time dependency on the downloading of the individual code pieces, since it would cause transmission delays—for the PC to prepare the pieces to be sent (host reaction delay).

SUMMARY OF THE INVENTION

The present invention concerns a system for acquiring a software code in a device from a host computer, which can make possible the use of a mere SRAM in the device for receiving the software and efficiently exploiting it in real time (without requiring an SDRAM component). The system of the invention can thus enable to overcome the synchronization problems mentioned above. The system of the invention may even allow, in preferred embodiments, to sensibly decrease the dependency on the PC status (OS type—for "Operating System", load, processor performance, etc.).

The invention is also related to a device comprising such a system, as well as to a corresponding process and computer program having the same potential advantages.

The invention further relates to a host computer and to a software transmission process and associated computer program, enabling to provide the advantages above, preferably in cooperation with the acquiring system and process of the invention.

The invention applies notably to the field of DSL modems, but also to other kinds of local network devices (notably for home networks), insofar as such devices have to receive operational software from a host PC.

To this end, the invention relates to a system for acquiring a software code in a device from a host computer, that system comprising receiving means for receiving at least one code portion of the software code intended for the device from the host computer.

According to the invention, at least two competing available code portions being proposed simultaneously to the device from the host computer for being downloaded to this device, the system comprises:
    delaying means able to send from the device to the host computer for each of the competing available portions, successive negative acknowledgements,
    and selecting means intended to select the code portion to be received among the competing available code portions.

The delaying means stop sending the negative acknowledgements for the portion selected by the selecting means, so that the receiving means receive only the selected portion to the exclusion of the available code portion competing with this selected portion.

Thus, though the software code can be downloaded in a very flexible way while having only limited memory resources at the receiving side, synchronization is surprisingly liable to be precisely controlled by this device. This is done thanks to the exploitation of the negative acknowledgements, or "NAKs", in a dynamic way, taking into account the specific requirements by the device. Namely, swap pages may be already in the pipe for being sent to the device, through IRPs (for "In/Out Request Packets"), before the device effectively needs them. The system of the invention can thereby be liable to remove the dependency on host loads, such as hard disk accesses, interrupts, OS or performances.

This result is all the more interesting that experiments have shown that the most unpredictable part of a system with host PC and device is the reaction time of the OS on the PC, to page swap requests from the device. This is even critical on some OS versions, under CPU (for "Central Processing Unit") and disk access load. This dependency can make the host computer very slow at responding a request of a next page by the device, therefore failing in the latency constraint for real time software. By contrast, the system of the invention may provide a mechanism that does not depend on the reaction from the host OS during a code swapping.

Thanks to the invention, different predefined scenarios can be programmed through parallel IRPs in the host computer, the device having the ability to decide the appropriate way to be followed, as and when its needs are specified. The software downloading achievement is then liable to be adjusted in real time by the device. In preferred embodiments, this may amount to progressing along suited branches in a code swap tree.

The acquiring system can thus enable to considerably decrease dependency on the host computer status (OS type, load, processor performances . . . ).

In what follows, the verbs "NAK" and "ACK" are used for brevity, for meaning respectively that some object is subject to negative acknowledgement or to positive acknowledgement.

The finally downloaded software code preferably comprises several successive code portions. However, in a special application of the acquiring system, it may be restricted to a unique portion. In any case, at least two code portions are competing for being downloaded to the device, which has then to choose between them.

The way for the host computer to "propose" the code portions to the device may be done in various ways in compliance with the invention. In a preferred embodiment, this is done through successive transfer attempts from the host computer to the device, based on given IRPs in the host computer. Each IRP then comprises at least one code page (called here code portion), made of several data packets. The transfer attempt for the current page of each concerned IRP is done by sending the first packet of this page to the device. This page contains notably information on the page identity (typically a page number), which enables the device to recognize the proposed page and to react accordingly. As long as the proposed page is NAKed, it is not sent completely by the host computer. By contrast, as soon as the sending of the NAKs is stopped for the first packet of this page, the complete page can be sent without delay since it is already ready and waiting for that.

The competing page (or pages), which continues to be NAKed while the selected one is accepted, is then processed by the host computer. In a preferred embodiment, the competing pages are parts of different branches defined in the host computer by means of respective IRPs, and the selection of one of the competing pages by the device leads implicitly to the selection of one of the branches. The host computer then advantageously cancels the IRPs corresponding to the non-selected branch(es), and keeps only the other one(s).

Preferably, the system comprises also:
request means for sending from the device to the host computer at least one transmission request before stopping sending the negative acknowledgements for the selected portion and before receiving the selected portion in the receiving means, when none of the competing code portions proposed to the device is appropriate for being selected by the selecting means.

In a particular implementation, the requests sent by the device to the host computer enable to specify the next page desired by the device, be it available or not at the computer side. When the requested page is not available, the host computer then proposes at least the correct page instead of at least one of the previously proposed ones (further pages can also be proposed in parallel with the correct page after cancellation of other proposed pages that are considered non-selectable because of the current request). On the other hand, when the requested page is available, since effectively proposed to the device by the host computer, it can then be downloaded without delay. The transmission of the requests by the device in the latter case can be exploited by the host computer to follow the execution flow and thereby to know more directly what pipes can be safely cancelled.

This request mechanism is thus particularly interesting when all possible choices for the competing code portions cannot be proposed in parallel, due to an insufficient number of parallel available tracks from the host computer to the device (like the number of end points at the device side, in preferred embodiments for which the number of potentially competing code portions is given by the number of end points). In such cases, it is possible to provide for the replacement of one (or several) of the competing code portions by another one, corresponding to the request by the device. In this way, more flexibility and more efficiency of the processing follow-up by the host computer are offered.

The requests from the device to the host computer can notably be sent by means of an interrupt mechanism between both apparatus, for example through a specific channel of a USB bus. In the case of a USB bus, the host computer typically asks for periodic interrupts to the device, such as each millisecond, and any of those interrupts can be used by the device for the next requests.

Advantageously, the receiving means, delaying means and selecting means are provided for at least two successively received code portions. This extends the applications of the acquiring system beyond the mere downloading of a unique code portion proposed among several available ones.

Preferably, the delaying means are able to continue sending the negative acknowledgements for each of the not selected competing available code portions, when the delaying means stop sending the negative acknowledgments for the selected portion.

Thus, the non-selected portions remain possibly available for next downloading steps, or for later canceling decision. It may however be also possible to provide for a systematic canceling at the host computer side, of all not selected competing code portions. In such case, the NAKing of the non-selected portions is no longer necessary.

According to preferred embodiments:
the receiving means comprise at least two end points for receiving respectively at least two of the competing available code portions,
and the delaying means are able to send to the host computer the successive negative acknowledgements for each of those end points.

Establishing a correspondence, at least partly, between the competing available code portions and the end points proves particularly efficient and convenient, and makes possible relatively easy implementation. Then, switching from an entry point to another in the device (by NAKing all transmission requests associated with the other entry points) may enable to pass from a swap sequence to another appropriate one. The advantages of this embodiment are all the more appreciable for the use of one end point per parallel competing code portion.

As the number of available end points is however limited, it may prove necessary to proceed by means of successive steps instead of parallel propositions. Especially, the host computer may later initiate a further code portion proposition (in particular through a new IRP dedicated to a further branch of code portions), during the software code transmission. This may arrive notably when more code pages have to be provided than available end points. Anyway, even in such cases, the dependency on the reaction time of the host computer can be sensibly reduced, though not completely eliminated. Also, the occurring of such new transmission requests can be decided by advance, so as to arrive only when page latency is less critical.

It is also possible in different kinds of implementations that the host computer sends the parallel code portions propositions to the device by means of other or complementary techniques, notably by interleaved code portions propositions on a same end point.

The number of the exploited end points for competing code portions propositions is preferably chosen by taking into account a trade off between capacities and cost of the device on one hand, and probability to meet software timings on the other hand (page latency requirements). Especially, the IC die size has to be considered for this trade off.

In preferred embodiments, the acquiring system comprises a storage space for temporarily storing the received code portion, this storage space being preferably constituted by an SRAM.

Each code portion is thus able to be entirely stored in the receiving device before being exploited thereby. The sizes of the code portions can be judiciously chosen, so that only a small size storage space, such as an SRAM, is necessary. The device may then make use of the complete software code portions as and when they are received.

In variant embodiments, the device is designed to partly, and not wholly, store the received code portions, so that special exploitation mechanisms have to be implemented at the device size for successively processing the various pieces of portions.

The receiving means and delaying means are advantageously provided for communicating with the host computer via a USB bus.

This USB bus can be used to run the code swaps, instead of a flash on the application board.

Preferably, the delaying means are provided for sending from the device to the host computer for the selected portion, at least one positive acknowledgement before the receiving means receive this selected portion.

The acquiring system thus does not merely cease sending the NAKs for the selected portion, possibly further transmitting a request for this portion, but also sends to the host computer one or several successive ACKs. An explicit acceptation of the next portion waiting at the computer side is thus given. In preferred embodiments, the code portions are made each of a plurality of packets, and the ACKs are successively sent for all of the packets of a portion once a downloading of this portion is decided at the device side.

According to a specific implementation thereof, the host computer is adapted to send an OUT token to the device, which is adapted to answer immediately by a NAK or an ACK. Then, if the device NAKs an OUT token, the host computer will try again later to resend the same portion of the code page.

In the present description, we consider generally the NAKs associated with OUT tokens, and not with IN tokens, though the NAKing of IN tokens can anyway be further applied as is usually done in known systems.

In another embodiment, the mere stopping of the NAKs sending by the device causes the transmission of the corresponding next portion by the host computer. Thus, the acceptation of the portions is here implicit, and does not require the sending of the ACKs.

The invention also applies to a device comprising an acquiring system according to any of the embodiments of the invention, and which preferably consists in a DSL modem. The device is advantageously intended to exploit the received software code in real time.

The invention further relates to a process for acquiring a software code in a device from a host computer, this acquiring process comprising receiving at least one code portion of the software code intended for the device from the host computer.

According to the invention, at least two competing available code portions being proposed simultaneously to the device from the host computer for being downloaded to this device, the acquiring process comprises:

sending from the device to the host computer for each of the competing available portions, successive negative acknowledgements, selecting the code portion to be received among the competing available code portions, and stopping sending the negative acknowledgements for the selected portion, so that only this selected portion is received by the device to the exclusion of the available code portion competing with the selected portion.

This process is preferably intended to be executed by an acquiring system according to any embodiment of the invention.

Another object of the invention is a computer program product comprising program code instructions for executing the steps of the acquiring process according to the invention, when that program is executed on a computer. By "computer program product", it is meant a computer program support, which may consist not only in a storing space containing the program, such as a diskette or a cassette, but also in a signal, such as an electrical or optical signal.

Another object of the invention is a host computer comprising:

storing means for storing a software code, in the form of at least two code portions, transmitting means for transmitting those code portions to a device, and delaying means for delaying the transmission of any of the code portions to the device upon receiving negative acknowledgements from the device for this code portion, until the receiving of the negative acknowledgements is stopped.

According to the invention, the host computer comprises also:

branching means for simultaneously proposing to the device at least two of the code portions competing in time for transmission, the transmission of each of those available competing code portions being liable to be delayed by the delaying means.

The host computer is preferably designed to cooperate with an acquiring system according to any embodiment of the invention.

As the host computer has at its disposal the whole software code to be transferred, it may exploit it for taking into account the topology of the code. Namely, the code portions are preferably chosen so as to judiciously propose to the device several available code portions among which to select the desired code portion. This may sensibly reduce, or even cancel, the time dependency of the code swap mechanism on the computer status, while making sufficient a relatively small storing space at the device side.

In preferred embodiments, the branching means are intended to simultaneously propose the competing code portions to the device for respectively at least two different end points of that device.

This corresponds to what has been described above for the device side. The host computer is thus able to initiate as many code portions propositions (or as many IRPs in the case of queues of code portions) as the number of end points.

The organized strategy at the host computer is all the more interesting when several successive pages forming queues are considered instead of individual portions, which is notably possible through IRPs. Then, the host computer has only to initiate the sending of each queue (or branch), several queues being liable to be sent in parallel.

Thus, the host computer preferably comprises chaining means intended to provide to the branching means at least two branches of code portions to be proposed successively to the device for transmission, each of those branches comprising at least one of the code portions competing in time with at least one of the code portions of another of those branches.

It should be noted that in such embodiments, two dimensions are considered together at the computer side:

a "vertical" dimension, corresponding to the competing code portions at any given time, and a "horizontal" dimension, related to the successively organized code portions in each of the branches; when a portion of a branch is proposed to the device, the other remaining portions of this branch are already prepared in the host computer, waiting to be proposed later if and when the previous portions of this branch have already been sent (or, in variant, have formerly been cancelled).

Preferably, the configuration of the branches is beforehand determined by a user of the host computer, taking into account the various parameters (number of available tracks, software structuring, size of the pages . . . ).

Also, the host computer preferably initiates IRPs for the competing branches before any request is sent from the device, with advantageously as many branches as end points. All those branches are in a first step NAKed by the device. The first code portion is then sent as soon as one of the branches, to which this portion belongs, ceases being NAKed.

In practice, according to advantageous implementations of the host computer, an application transmits a buffer content with any of the branches (IRP) to a driver, which then tries to send it to the device in a mechanical way (for example in the form of successive USB packets). The reception of the successive NAKs from the device delays this sending.

According to preferred embodiments, at least one of the branches comprises at least two of the code portions.

More specifically, the presence of several code portions in each of the branches provides an efficient tool for taking into account various potential evolutions of the program execution.

In other embodiments, each branch is reduced to a unique portion. In such case, further to the very special embodiment in which the software code to be executed is entirely contained in one portion, the host computer advantageously provides for the repetitive succession of a same pattern of code portions. For example, portions A, B, C and D are proposed simultaneously to the device, which selects successively A, B, C and D, then again A, B, C and D and so on. Each time a given portion has been selected, it is proposed again in the same track later, through the further initiation of the associated IRP in the host computer. In this way, it is possible to avoid slowdowns in the code downloading due to initiating steps, since the preparation in the host computer of the next portion not yet available (e.g. A) takes place during the downloading of the other already available portions (e.g. B, C and D).

Preferably, the host computer comprises canceling means able to cancel any of the branches of code portions proposed by the branching means to the device, after receiving negative acknowledgements for the currently proposed code portion of this branch while ceasing receiving negative acknowledgements for the currently proposed code portion of another of the branches.

This embodiment enables to free memory space at the host computer side, whence a proposed branch proves useless for the following steps, in view of the previous choices by the device. It may also allow reinitiating the sending of a further software branch in the released track. Such decisions are preferably taken automatically by the host computer, in function of an initially recorded strategy in relation with the software code topology.

This is preferably done by anticipating the potential needs of the loaded branches by the device, so that no time is lost due to the computer preparation operations. However, it may also arrive that a loading of a next branch must be done in real time, as and when a corresponding request is received from the device—notably when the number of available tracks (such as end points) is not enough with respect to the number of potential choices by the device at a given moment. As noted before, such operation should then be preferably programmed only when the page latency is less critical.

The invention also pertains to a software transmission process comprising:

storing a software code, in the form of at least two code portions, transmitting the code portions to a device, and delaying the transmission of any of the code portions to the device upon receiving negative acknowledgements from the device for this code portion, until the receiving of those negative acknowledgements is stopped.

According to the invention, the software transmission process comprises also:

simultaneously proposing to the device at least two of the code portions competing in time for transmission, the transmission of each of those available competing code portions being liable to be delayed by means of the negative acknowledgements.

This software transmission process is preferably intended to be executed by a host computer according to any embodiment of the invention.

Another object of the invention is a computer program product comprising program code instructions for executing the steps of the transmission process according to the invention, when that program is executed on a computer.

BRIEF DESCRIPTION OF THE DRAWINGS

The invention will be better understood and illustrated by means of the following embodiment and execution examples, in no way limitative, with reference to the appended figures on which.

DETAILED DESCRIPTION OF THE PREFERRED EMBODIMENTS

Figure 1:
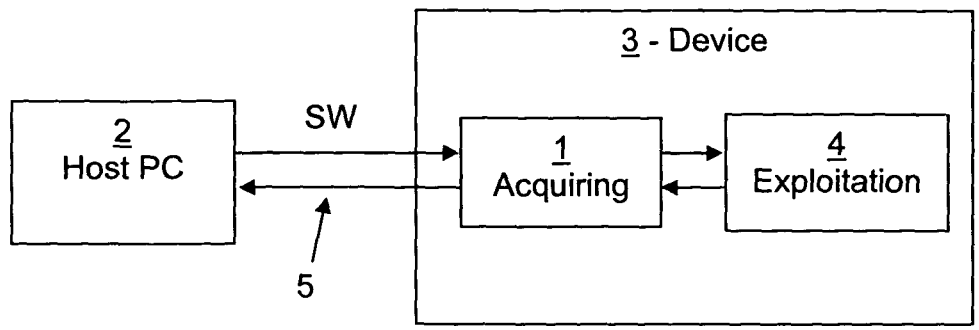
FIG. 1 shows a local network arrangement involving a host PC connected to a device, the latter comprises an acquiring system according to the invention.
Figure 2:
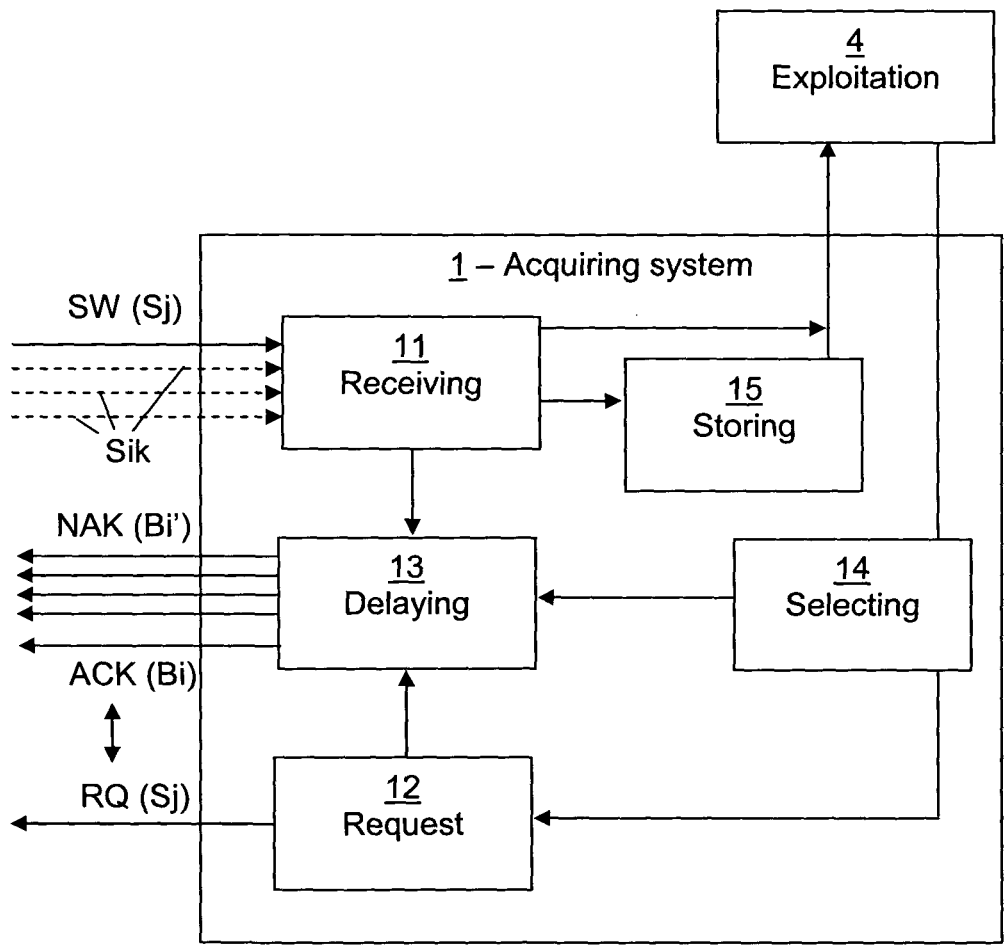
FIG. 2 is a block diagram of the acquiring system of FIG. 1.
Figure 3:
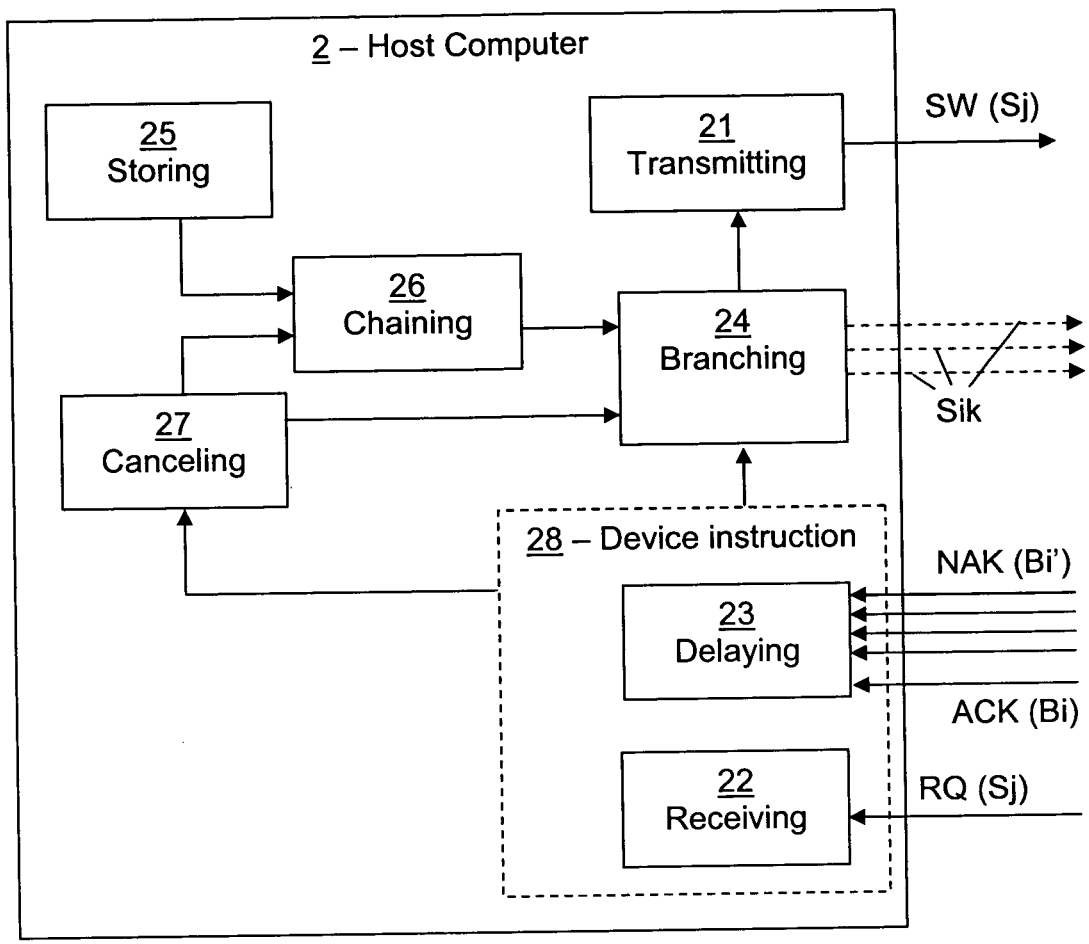
FIG. 3 is a block diagram of the host PC of FIG. 1.

In FIGS. 1 to 3, the represented blocks are purely functional entities, which do not necessarily correspond to physical separated entities. Namely, they could be developed in the form of software, or be implemented in one or several integrated circuits.

Moreover, a generic number notation liable to be completed by letters (like for example "3A") refers to a given model object (device 3), which is specified for a specific embodiment (letter "A").

A local network arrangement (FIG. 1) comprises a host PC 2 connected to a device 3, via a bi-directional link 5. The device 3 comprises an acquiring system 1 for acquiring software SW from the PC 2, and an exploitation unit 4 for exploiting this downloaded software SW. In the described embodiments, the exploitation unit 4 is intended to exploit the software SW in real time, as and when the latter is being downloaded.

The acquiring system 1 (FIG. 2) comprises:
- a receiving module 11 for receiving the software SW from the PC 2, through the transmission (continuous arrow line on FIG. 2) of successive swap pages Sj (with j=1, 2, 3 . . . ); the receiving module 11 also receives simultaneous propositions of swap pages "Sik" for downloading (dotted arrow lines), before the transmission of one of them is requested to the PC 2 by the device 3; each of those swap pages Sik belongs to a given software block Bi of at least one swap page, and is referred "k" in this block Bi; the selected swap page Sik becomes the next transmitted page Sj; in the described embodiments, each competing swap page Sik, and consequently each competing block Bi, is at a given time associated with a determined end point EPm of the device 3;
- a request module 12 for preparing and sending to the PC 2 a transmission request RQ(Sj), so as to request to the PC 2 the sending of the next swap page Sj desired by the exploitation unit 4 (when the processor embedded in the device 3 needs the next swap);
- a delaying module 13, for preparing and sending to the PC 2 successive NAKs for each of the proposed swap pages Sik, so as to delay the sending of this page Sik until its downloading is requested by the device 3; in the described achievement, the delaying module 13 is also able to send ACKs to the PC 2, for causing the sending to the device 2 of the expected swap page Sik among the proposed ones, at the appropriate moment after delaying; as each swap page Sik is associated to a block Bi, the NAKs and ACKs may in fact be considered as specified for the blocks Bi themselves (as illustrated, block Bi is acknowledged while other blocks Bi' are delayed); in practice, in the described embodiments, the NAKs and ACKs are sent for the exploited end points Epm; on USB, such explicit ACKing is required for the swap pages Sik to be transmitted; in variant examples, the mere cessation of NAKs sending is enough to cause the sending of the next desired and proposed swap page Sj;
- and a storing module 15 for temporarily storing the downloaded swap pages Sj, while they are used by the exploitation unit 4.

The host computer 2 (FIG. 3) comprises:
- a storing module 25 for storing the software SW to be downloaded to the device 3;
- a transmitting module 21 for sending the successively requested swap pages Sj to the device 3;
- a receiving module 22 for receiving the transmission request RQ(Sj) from the device 3, requesting the sending of the next swap page Sj;
- a branching module 24 for simultaneously proposing to the device 3 at least two swap pages Sik of respective blocks Bi, competing in time for transmission;
- a delaying module 23 for delaying the transmission of the proposed swap pages Sik as long as it receives NAKs from the device 3 for those pages Sik; once the NAKs are stopped for one of the proposed swap pages Sik, this page becomes the next one Sj to be sent to the device 3 by the transmitting module 21; the receiving module 22 and delaying module 23 form together a device instruction module 28;
- a chaining module 26 for providing to the branching module 24 the successive pages Sik of the constituted blocks Bi intended to compete in time for transmission and to be simultaneously proposed to the device 3; in the described embodiments, the blocks Bi are defined in the host computer 2 by means of IRPs; if a request RQ received from the device 3 relates to a page Sj that is not currently proposed by the branching module 23 as one of the competing swap pages Sik, the requested page Sj is retrieved by the chaining module 26, provided to the branching module 24 and then sent to the device 3 by the transmitting module 21;
- and a canceling module 27 for possibly canceling any of the blocks Bi' (namely of the corresponding IRP) currently proposed by the branching module 24, when another of the waiting blocks Bi is instead chosen by the device 3 for next transmission and when block Bi' proves useless for following steps.

Figure 4:
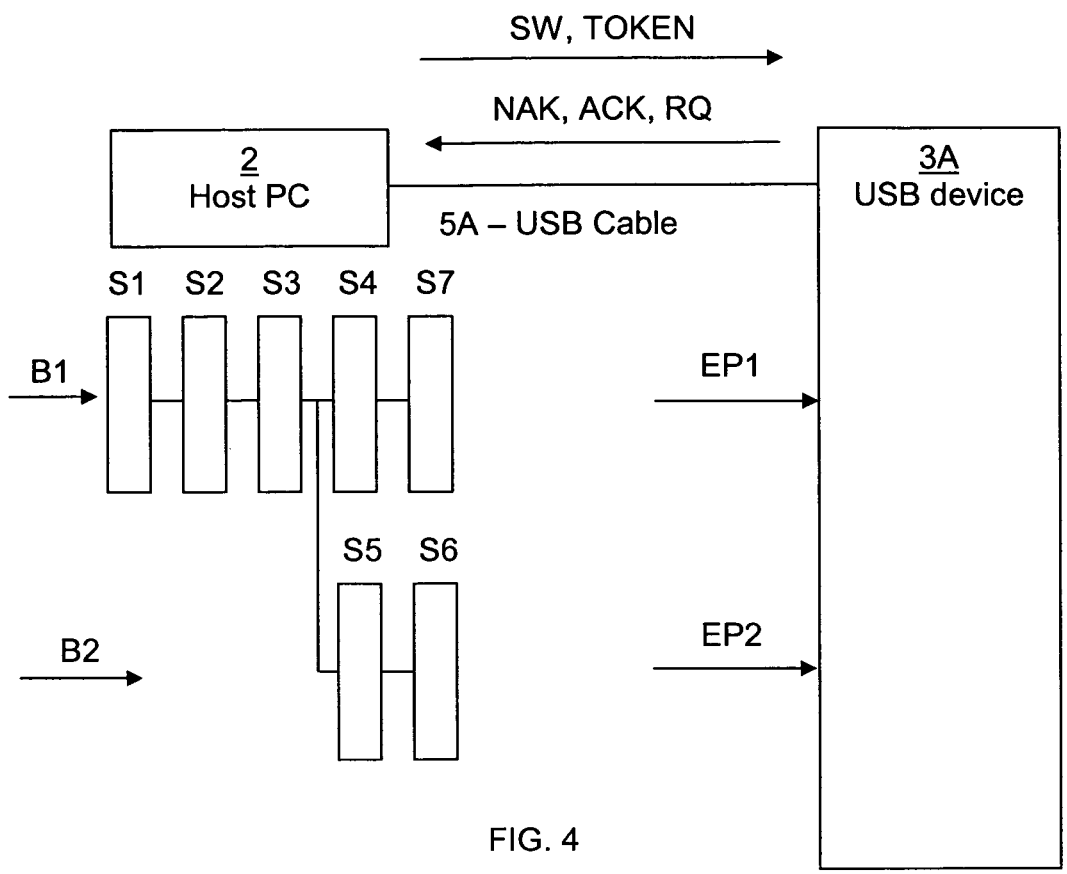
FIG. 4 represents an example of the local network arrangement of FIG. 1, exploiting an embodiment of the acquiring system of FIG. 2 and of the host PC of FIG. 3.

In an example of the local network arrangement (FIG. 4), the bi-directional link 5 is a USB cable 5A and the device 3 is a USB device 3A. For sake of illustration, the latter has here two available end points EP1 and EP2, which can be respectively exploited for the simultaneous proposition of two software blocks B1 and B2.

By way of illustration, the host PC 2 is intended to periodically send to the device 3A, further to the software SW, tokens TOKEN for checking packet reception by the device 3A. On its part, the device 3A is able to send NAK and ACK messages as well as requests RQ to the PC 2.

More specifically, when the device NAKs an OUT token, the PC 2 will try again later to send the next swap page Sj, after a preset period.

In the present description, we refer to NAKs for designating the NAKs to OUT tokens.

The blocks B1 and B2 are made available through corresponding IRPs at the PC side, noted respectively IRP1 and IRP2.

The blocks B1 and B2 comprise:
the swap pages S1 to S3, S4 and S7 for the block B1;
and the swap pages S5 and S6 for the block B2.

Thanks to this arrangement, two scenarios can be taken into account, in which the swap pages S4 and S7 of block B1 are provided in competition with the swap pages S5 and S6 of block B2, as possible alternative steps.

Figure 5:
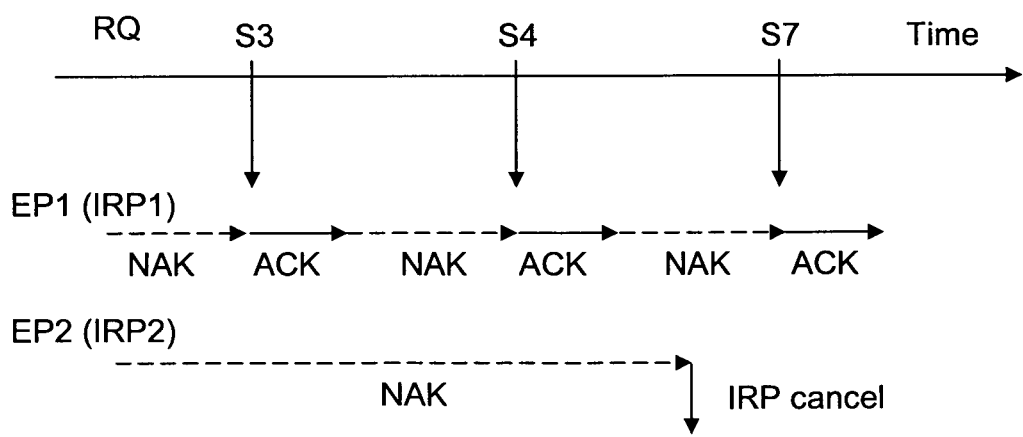
FIG. 5 represents the exchanges between the host PC and the device in the exemplified local network arrangement of FIG. 4, in a first swap sequence.
Figure 6:
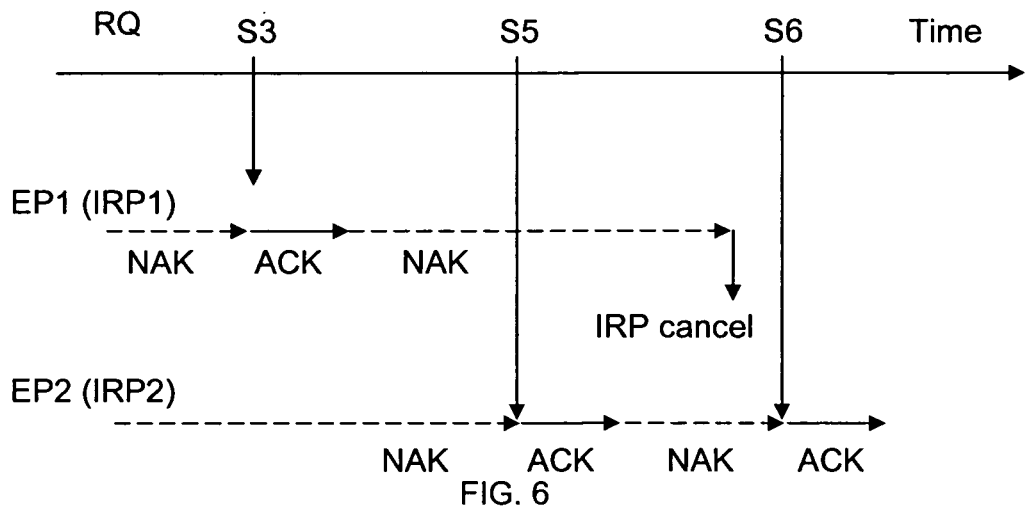
FIG. 6 represents the exchanges between the host PC and the device in the exemplified local network arrangement of FIG. 4, in a second swap sequence.

In operation, the actions of the PC 2 and of the device 3A can be represented in parallel in function of time (FIGS. 5 and 6). According to the first scenario (FIG. 5), only block B1 is effectively exploited, which means that the swap pages S1 to S3, S4 and S7 are successively selected by the device 3A. Then, only end point EP1 is used for portion transmission, the other end point EP2 being subjected to systematic NAKing. Detailing the process, before swap page S1 is sent, both blocks B1 and B2 are NAKed, via the end points EP1 and EP2. When first page S1 is requested, the device 3A stops to NAK the first block B1 and ACKs it, so that page S1 is downloaded, and then both blocks B1 and B2 are again NAKed. The same is applied later successively to swap pages S2, S3 and S4. After this fork passage, the second block B2 (namely the corresponding IRP IRP2) is cancelled by the PC 2, since block B2 can have no more utility for the next steps. The sending of last page S7 of block B1 is then done at the right moment as requested by the device 3A, by merely ceasing NAKing block B1 and by ACKing it.

According to the second scenario (FIG. 6), a switch is to be done from block B1 to block B2 after the transmission of swap page S3. More specifically, the successive sent pages are S1 to S3, S5 and S6. In this case, software block B1 is exploited like in the first scenario until swap page S3 is received and both blocks B1 and B2 are again NAKed. However, at this fork point, swap page S5 is requested and ACKed while block B1 continues to be NAKed. It results that here, the first IRP IRP1 is later cancelled by the PC 2 since it has become useless for the following steps. The block B2 is NAKed after the transmission of page S5 until the last remaining page S6 of block B2 is requested and ACKed at its turn for the last transmission.

The choice of either of the scenarios is decided in real time by the device 3A, depending on the circumstances in the exploitation of the software SW by the exploitation unit 4.

Such a mechanism makes the processing independent of the host PC 2, because the transmission of the blocks B1 and B2 are already initiated before the device 3A even begins to request the desired packets. This mechanism is therefore completely under the control of the device 3A and only involves the USB host controller at the PC 2 side. Indeed, it requires no host operating system interaction—this is particularly advantageous towards the reactions of the host PC 2 operating system to interrupts for starting transfers, which are the most critical times.

Figure 7:
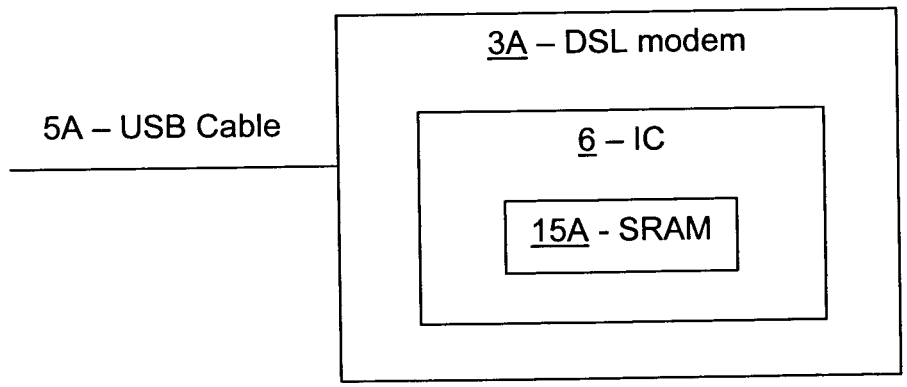
FIG. 7 shows a specific embodiment of the device of FIGS. 2 and 4 to 6, for DSL.

In a specific embodiment for DSL (FIG. 7), the USB device 3A is a DSL modem, noted 3A'. The modem 3A' comprises an IC 6, allotted with an SRAM 15A forming the storing module 15. The latter may get filled with the swap code (next page Sj) each time the data are downloaded from the PC 2.

Figure 8:
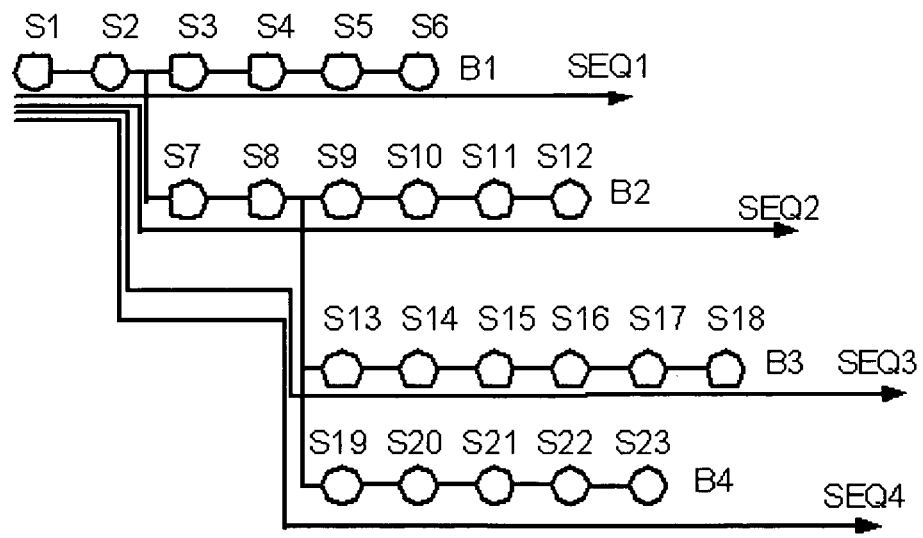
FIG. 8 illustrates a swap pages topology comprising four swap branches and four potential swap sequences based on those branches.

A more complex case will be now described, in which a swap topology comprises four swap branches B1 to B4 (FIG. 8) and four potential swap sequences SEQ1 to SEQ4 (or scenarios) based on those branches Bi. The configuration of the branches and scenarios is constructed in view of four end points EP1 to EP4 at the device 3, the four sequences SEQ1 to SEQ4 being made possible by the software build.

In the illustrated example:
branch B1 comprises swap pages S1 to S6;
branch B2 comprises swap pages S7 to S12, pages S7 to S10 being respectively in parallel with pages S3 to S6 of branch B1;
branch B3 comprises swap pages S13 to S18, pages S13 to S16 being respectively in parallel with pages S9 to S12 of branch B2;
and branch B4 comprises swap pages S19 to S23, which are respectively in parallel with pages S13 to S17 of branch B3.

Then:
first sequence SEQ1 relies purely on branch B1, through the unfolding of successive pages S1 to S6;
second sequence SEQ2 relies on the combination of branches B1 and B2, through the unfolding of successive pages S1 and S2 and then S7 to S12 after switching from branch B1 to branch B2 (first fork);
third sequence SEQ3 relies on the combination of branches B1, B2 and B3, through the unfolding of successive pages S1 and S2 of B1, S7 and S8 of B2, and S13 to S18 of B3 through two switching steps from branch B1 to B2 (first fork) and from branch B2 to B3 (second fork);
and fourth sequence SEQ4 relies on the combination of branches B1, B2 and B4, through the unfolding of successive pages S1 and S2 of B1, S7 and S8 of B2, and S19 to S23 of B4 through two switching steps from branch B1 to B2 (first fork) and from branch B2 to B4 (second fork).

Figure 9:
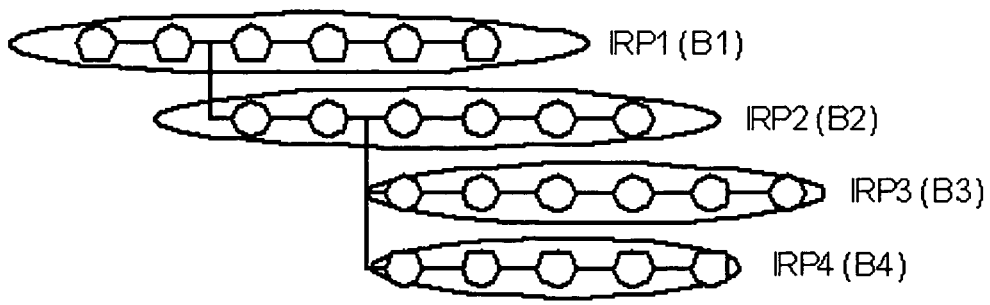
FIG. 9 shows four IRPs exploited by an implementation enabling four end points of the acquiring system of FIG. 2 and by the host PC of FIG. 3, for processing the swap pages topology of FIG. 8.

In operation, branches B1 to B4 are respectively associated with four transmission IRPs, noted IRP1 to IRP4 (FIG. 9), which are used with the four available end points EP1 to EP4 similarly to what has been described above for two end points. Therefore, depending on external factors, the downloaded software SW takes one of the particular four sequences SEQ1 to SEQ4.

More generally, the page swaps Sj are organized in competing branches Bi so that there is the least possible of them. Preferably, each of the branches Bi is dedicated to a given end point EPi to which it must be sent, as mentioned above. However, as the number of end points EPm if limited, it may arrive that multiple branches Bi must be sent on the same end point.

Thus, in the example above with four branches B1 to B4 (FIGS. 8 and 9), if the device 3 has only three end points EPm for the download, the fourth branch B4 may be sent on the same end point EP1 as the first branch B1. Indeed, at the first fork, either swap page S3 is requested, which means that the first sequence is adopted and that branches B2 to B4 are useless later, or swap page S7 is requested, which means that one of the three other sequences will be chosen. In the latter case, branch B1 can be cancelled and replaced by branch B4 as soon as the first fork is passed, which leaves still a delay corresponding to the downloading of the two next pages S7 and S8 of branch B2 before the second fork is reached and branch B4 may become necessary (fourth sequence SEQ4).

Also, if a "crossroad" has more pages Sj possible than end points EPm, the host PC 2 cancels the unnecessary branch(es) Bi as soon as it receives from the device 3 a page request RQ corresponding to none of the available competing branches, and initiates a new IRP with a further branch corresponding to the requested page Sj. In this case, the system is no more independent of the reaction time of the host PC 2 operation system. So, this is done only when the page latency is less critical.

The invention claimed is:
1. In a device coupled to a host computer, a method for dynamically acquiring program software code from the host computer for execution in the device, the method comprising:
receiving, from the host computer, proposals for at least two competing portions of the program software code for downloading to said device from the host computer,
sending, to the host computer, for each of said proposals for the at least two competing portions of the program software code, successive negative acknowledgements, so that as long as a negative acknowledgement is sent for a code portion of the program software code, said code portion of the program software code is not received at said device,
selecting one of the proposals for the at least two competing portions of the program software code as a selected portion of the program software code to be received among said at least two competing portions of the program software code, wherein said negative acknowledgements are stopped being sent for the selected portion of the program software code, so that only said selected portion of the program software code is received, while reception of any other available code portion of the program software code competing with said selected portion of the program software code is prevented, and storing the selected and received portion of the program software code at said device on a computer readable storage medium for subsequent execution in the device.

2. In the device according to claim 1, the method further comprising:

sending from said device to the host computer at least one transmission request before stopping sending said negative acknowledgements for said selected portion of the program software code and before receiving said selected portion of the program software code, when none of said other available code portions of the program software code competing with said selected portion of the program software code is appropriate for being selected.

3. In the device according to claim 1, the method comprising wherein said receiving, sending and selecting are provided for at least two successively received code portions of the program software code.

4. In the device according to claim 3, the method comprising wherein:

said receiving further comprises receiving at least two of said competing portions of the program software code on at least two end points, and said sending further comprises sending to the host computer said successive negative acknowledgements for each of said end points.

5. In the device according to claim 1, the method comprising wherein said sending further comprises continuously sending said negative acknowledgements for each non-selected one of the at least two competing portions of the program software code, when said negative acknowledgements are stopped being sent for said selected portion of the program software code.

6. In the device according to claim 1, the method comprising wherein said storing further comprises temporarily storing said selected code portion of the program software code on Static Random Access Memory.

7. In the device according to claim 1, the method comprising wherein said receiving and sending further comprises communicating with the host computer via a USB bus.

8. In the device according to claim 1, the method comprising wherein said sending further comprises sending from said device to the host computer for said selected portion of the program software code, at least one positive acknowledgement before receiving said selected portion of the program software code.

9. In the device according to claim 1, the method comprising wherein the device is a DSL modem.

10. In the device according to claim 9, the method comprising wherein said device executes the received portion of the program software code in real time.

11. A non-transitory computer program product stored on a non-transitory computer-readable storage medium, wherein the non-transitory computer program product comprises program code for carrying out the method of claim 1 when said program code is executed on said device coupled to said host computer.

12. In a host computer coupled to a device, a method for software transmission to the device, comprising:

storing program software code in the form of at least two code portions, transmitting proposals-to-transmit for said at least two code portions of the program software code to the device, delaying the transmission of any of said at least two code portions of the program software code to said device upon receiving negative acknowledgements from said device for said at least two code portions of the program software code, until the receiving of said negative acknowledgements is stopped, so that as long as a negative acknowledgement is received for a particular code portion of the program software code, said particular code portion of the program software code is not transmitted, and wherein said method further comprises:

simultaneously proposing to said device at least two of said at least two code portions of the program software code competing in time for transmission, the transmission of each of said at least two competing code portions of the program software code being liable to be delayed, and cancelling proposals-to-transmit for non-selected code portions of the program software code and storing proposals-to-transmit for code portions of the program software code where said negative acknowledgements is stopped for subsequent execution in the device.

13. In the host computer according to claim 12, the method comprising wherein said-simultaneously proposing of said at least two competing code portions of the program software code to said device is performed via at least two different end points of said device.

14. In the host computer according to claim 13, the method comprising providing at least two branches to be proposed successively to said device for transmission, each of said at least two branches comprising at least one of said at least two competing code portions of the program software code competing in time with at least one of another of said at least two competing code portions of the program software code of another of said at least two branches.

15. In the host computer according to claim 14, the method comprising wherein at least one of said at least two branches comprises at least two of said at least two competing code portions of the program software code.

16. In the host computer according to claim 15, the method comprising canceling any of said at least two branches after receiving negative acknowledgements for the currently proposed one of said at least two competing code portions of the program software code of said at least two branches while ceasing to receive negative acknowledgements for another currently proposed one of said at least two competing code portions of the program software code of another of said at least two branches.

17. A non-transitory computer program product stored on a non-transitory computer-readable storage medium, wherein the non-transitory computer program product comprises program code for carrying out the method of claim 12 when said program code is executed on the host computer.

* * * * *